(12) United States Patent
Bian et al.

(10) Patent No.: US 12,131,490 B2
(45) Date of Patent: Oct. 29, 2024

(54) IMAGE PROCESSING METHOD AND IMAGE PROCESSING APPARATUS, AND ELECTRONIC DEVICE USING SAME

(71) Applicant: ArcSoft Corporation Limited, Zhejiang (CN)

(72) Inventors: Qiaoling Bian, Zhejiang (CN); Yanqing Lu, Zhejiang (CN); Jin Wang, Zhejiang (CN)

(73) Assignee: ArcSoft Corporation Limited, Zhejiang (CN)

( * ) Notice: Subject to any disclaimer, the term of this patent is extended or adjusted under 35 U.S.C. 154(b) by 359 days.

(21) Appl. No.: 17/763,678

(22) PCT Filed: Sep. 24, 2020

(86) PCT No.: PCT/CN2020/117520
§ 371 (c)(1),
(2) Date: Mar. 25, 2022

(87) PCT Pub. No.: WO2021/063245
PCT Pub. Date: Apr. 8, 2021

(65) Prior Publication Data
US 2022/0343520 A1    Oct. 27, 2022

(30) Foreign Application Priority Data
Sep. 30, 2019    (CN) .......................... 201910943314.8

(51) Int. Cl.
*G06T 7/37*    (2017.01)
*G06T 3/40*    (2024.01)
*G06T 5/50*    (2006.01)

(52) U.S. Cl.
CPC .................. *G06T 7/37* (2017.01); *G06T 3/40* (2013.01); *G06T 5/50* (2013.01); *G06T 2207/20081* (2013.01); *G06T 2207/20221* (2013.01)

(58) Field of Classification Search
CPC .... G06T 7/37; G06T 3/40; G06T 5/50; G06T 2207/20081; G06T 2207/20221;
(Continued)

(56) References Cited

U.S. PATENT DOCUMENTS 11,748,991 B1 *    9/2023    Day .......................... B60Q 3/74
                                                                    348/143
2008/0030592 A1    2/2008    Border et al.
(Continued)

FOREIGN PATENT DOCUMENTS

CN    102075679 A    5/2011
CN    105828067 A    8/2016
(Continued)

*Primary Examiner* — Iriana Cruz
(74) *Attorney, Agent, or Firm* — Samson G. Yu (57) ABSTRACT

Disclosed are an image processing method and an image processing apparatus, and an electronic device using same. The image processing method includes: acquiring a first image by a first photographing unit; acquiring a second image by a second photographing unit; registering a first region in the first image and the second image to obtain a registration result, where the first region and the second image correspond to the same field of view; and fusing the first region and the second image according to the registration result to obtain a fusion image. Images acquired by photographing units with at least two different fields of view can be fused, so as to optimize image duality, display higher-definition images and solve the technical problem of poor quality of images acquired on the basis of a plurality of photographing units.

14 Claims, 7 Drawing Sheets

(58) Field of Classification Search
CPC . G06T 2207/10024; G06T 2207/20084; G06T 3/4038; H04N 23/60; H04N 23/951; H04N 5/265; H04N 23/57; H04N 23/90
See application file for complete search history.

(56) References Cited

U.S. PATENT DOCUMENTS

| | | | |
|---|---|---|---|
| 2017/0251134 A1* | 8/2017 | Zhang | G01J 3/36 |
| 2018/0048825 A1* | 2/2018 | Wang | H04N 23/45 |
| 2018/0352165 A1* | 12/2018 | Zhen | G06T 3/4038 |
| 2018/0359423 A1* | 12/2018 | Shabtay | H04N 23/00 |
| 2019/0260978 A1 | 8/2019 | Guerin et al. | |
| 2020/0020085 A1* | 1/2020 | Pekkucuksen | G06T 5/50 |
| 2020/0090359 A1* | 3/2020 | Pillai | G06V 10/82 |
| 2021/0133996 A1* | 5/2021 | Zhou | G06T 7/521 |

FOREIGN PATENT DOCUMENTS

| | | |
|---|---|---|
| CN | 106385541 A | 2/2017 |
| CN | 107087107 A | 8/2017 |
| CN | 107770433 A | 3/2018 |
| CN | 108989647 A | 12/2018 |
| CN | 109479092 A | 3/2019 |
| JP | 2009194700 A | 8/2009 |
| JP | 2016527734 A | 9/2016 |
| JP | 2019069145 A | 5/2019 |
| KR | 101634516 B1 | 6/2016 |
| WO | 2019167571 A1 | 9/2019 |

* cited by examiner

IMAGE PROCESSING METHOD AND IMAGE PROCESSING APPARATUS, AND ELECTRONIC DEVICE USING SAME

CROSS-REFERENCE TO RELATED APPLICATION

The disclosure claims the right of priority of the Chinese patent application No. 201910943314.8, filed on Sep. 30, 2019 and entitled "Image processing method and image processing apparatus, and electronic device using same", which is incorporated herein by reference in its entirety.

TECHNICAL FIELD

The disclosure relates to a computer vision technique, in particular to an image processing method and an image processing apparatus, and an electronic device using same.

BACKGROUND

In recent years, as an electronic technique constantly develops, various electronic products, particularly electronic products with photographing apparatuses, such as televisions (TVs), mobile phones, desktop computers, notebook computers, tablet computers and personal digital assistants (PDAs) are widely used in various fields of life. At the same time, demands of users for these photographing apparatuses are on the increase, so product manufacturers have to develop new functions one after another to meet the demands of users.

Since the first mobile phone with a photographing function emerged in 2000, the photographing function has become an indispensable function of a mobile phone, and draws special attention from customers at present. Currently, a dual-camera smart phone or tablet computer on the market typically has two cameras mounted on the front and back of the device respectively, or both on the back of the device. A common dual-camera device is a device with a wide-angle lens and a telephoto lens, which can show a clear close shot and a clear long shot respectively according to a selection of a user.

Due to the size and weight of portable electronic devices such as smart phones or tablet computers), multi-camera based smart electronic devices will become a trend in order to get better photographing results. However, how to process images acquired by different cameras to further improve the quality of the output images is one of the focuses of attention.

SUMMARY

The embodiments of the disclosure provide an image processing method and an image processing apparatus, and an electronic device using same, so as to at least solve the technical problem of poor quality of images acquired on the basis of a plurality of photographing units.

One aspect of the embodiments of the disclosure provides the image processing method used for the electronic device having at least two photographing units. The image processing method, applied in an electronic device having at least two photographing units, includes: acquiring a first image by a first photographing unit; acquiring a second image by a second photographing unit; registering a first region in the first image and the second image to obtain a registration result, where the first region and the second image correspond to the same field of and fusing the first region and the second image according to the registration result to obtain a fusion image.

Optionally, the image processing method further includes: processing a second region in the first image by using image quality improvement technique, where the second region is a region except the first region in the first image.

Optionally, the image quality improvement technique includes a deep learning technique based on a single frame or multiple frames.

Optionally, the first photographing unit and the second photographing unit have different fields of view.

Optionally, the step of registering the first region in the first image and the second image to obtain the registration result includes: shrinking the first region and the second image according to a predetermined ratio to obtain a first shrunken image and a second shrunken image; processing the first shrunken image and the second shrunken image by using a preset method to obtain a first result image and a second result image; magnifying the first result image and the second result image according to the predetermined ratio to obtain a first magnified image and a second magnified image; and processing the first magnified image and the second magnified image by using a first registration method to obtain the registration result.

Optionally, the preset method is a Dense Inverse Search (DIS) optical flow method.

Optionally, the step of processing the first shrunken image and the second shrunken image by using the preset method to obtain the first result image and the second result image includes: performing a first process on the first shrunken image and the second shrunken image to obtain a first processing result, wherein the first process comprises epipolar line rectification and matching computation; and performing a second process on the first processing result to obtain the first result image and the second result image.

Optionally, the step of performing the second process on the first processing result to obtain the first resit image and the second result image includes: processing the first processing result by using epipolar line rectification inverse transformation and a second registration method to obtain the first result image and the second result image.

Optionally, the step of processing the first processing result by using epipolar line rectification inverse transformation and the second registration method to obtain the first result image and the second result image includes: processing the first processing result by using the epipolar line rectification inverse transformation to obtain a second processing result; and processing the second processing result by using the second registration method to obtain the first result image and the second result image.

Optionally, the step of processing the first processing result by using epipolar line rectification inverse transformation and the second registration method to obtain the first result image and the second result image includes: processing the first processing result by using the second registration method to obtain a third processing result; and processing the third processing result by using epipolar line rectification inverse transformation to obtain the first result image and the second result image.

Optionally, the first registration method includes at least one of the following: a dense optical flow computation method, a semi-dense optical; flow computation method, a local registration method and a global registration method.

Optionally, the step of fusing the first region and the second image according to the registration result to obtain the fusion image includes: determining, according to the registration result, parallax between the first region and the second image, a shielding degree or whether there is a moving object in a field of view; computing a difference value according to one or more of the parallax between the first region and the second image, the shielding degree or whether there is the moving object in the field of view; comparing the difference value with a preset threshold to obtain a comparison result; and fusing the first region and the second image according to the comparison result to obtain the fusion image.

Optionally, the step of the fusing the first region and the second image according to the comparison result to obtain the fusion image comprises: when the difference value is greater than or equal to the preset threshold, the comparison result indicates that the parallax between the first region and the second image is relatively great, the shielding degree is relatively great or there is a moving object in the field of view, and corresponding pixel points of the first region and the second image are not to be fused. When the difference value is smaller than the preset threshold, the comparison result indicates that the parallax between the first region and the second image is relatively small, the shielding degree is relatively small, or there is no a moving object in the field of view, and corresponding pixel points of the first region and the second image are to be fused.

Another aspect of the embodiments of the disclosure further provides the image processing apparatus. The image processing apparatus includes: a first photographing unit configured to acquire a first image; a second photographing unit configured to acquire a second image; a registration unit configured to register a first region in the first image and the second image to obtain a registration result, where the first region and the second image correspond to the same fled of view; and a fusion unit configured to fuse the first region and the second image according to the registration result to obtain a fusion image.

Optionally, the registration unit includes: a shrinking unit configured to shrink the first region and the second image according to a pre-determined ratio to obtain a first shrunken image and a second shrunken image; a first processing unit configured to process the first shrunken image and the second shrunken image by using a preset method to obtain a first result image and a second result image; a magnification unit configured to magnify the first result image and the second result image according to the predetermined ratio to obtain a first magnified image and a second magnified image; and a first registration sub-unit configured to process the first magnified image and the second magnified image by using a first registration method to obtain the registration result.

Optionally, the fusion unit includes: a determination unit configured to determine, according to the registration result, parallax between the first region and the second image, a shielding degree or whether there is a moving object in a field of view; a computation unit configured to compute a difference value according to one or more of the parallax between the first region and the second image, the shielding degree or whether there is the moving object in the field of view; a comparison unit configured to compare the difference value with a preset threshold to obtain a comparison result; and a fusion sub-unit configured to fuse the first region and the second image according to the comparison result to obtain the fusion image.

Another aspect of the embodiments of the disclosure further provides a storage medium including a stored program, where when the program is run, a device where the storage medium is positioned is controlled to implement any one of the above image processing methods.

Another aspect of the embodiments of the disclosure further provides an electronic device. The electronic device includes: a processor, and a memory configured to store an executable instruction of the processor, where the processor is configured to execute the executable instruction to implement any one of the above image processing methods.

In the embodiments of the disclosure, by implementing the following steps: acquiring the first image by the first photographing unit; acquiring the second image by the second photographing unit; registering the first region in the first image and the second image to obtain the registration result, where the first region and the second image correspond to the same field of view; and fusing the first region and the second image according to the registration result to obtain the fusion image, images acquired by photographing units with at least two different fields of view may be fused, so as to optimize image quality, display higher-definition images and solve the technical problem of poor duality of images acquired on the basis of a plurality of photographing units.

BRIEF DESCRIPTION OF THE DRAWINGS

The accompanying drawings described herein are used for providing further understanding of the disclosure and constitute a part of the disclosure, and the illustrative embodiments of the disclosure and the description of the illustrative embodiments are used for explaining the disclosure and do not constitute an improper limitation on the disclosure. In the accompanying drawings.

DETAILED DESCRIPTION OF THE EMBODIMENTS

In order to enable those skilled in the art to better understand the solution of the disclosure, the technical solutions in the embodiments of the disclosure will be clearly and completely described in conjunction with the accompanying drawings in the embodiments of the disclosure, and obviously, the embodiments described are merely a part rather than all of the embodiments of the disclosure. On the basis of the embodiments of the disclosure, all other embodiments obtained by those of ordinary skiff in the art without making inventive efforts should all fall within the scope of protection of the disclosure.

It should be noted that terms of "first", "second", etc. In the description, claims and the above accompanying drawings of the disclosure are used for distinguishing similar subjects instead of being used for describing a specific order or precedence order. It should be understood that the order used in this way may be interchanged where appropriate, such that the embodiments of the disclosure described herein may be implemented in an order other than those orders illustrated or described herein. In addition, terms "include", "have", and any variations thereof are intended to cover non-exclusive inclusions, for example, processes, methods, systems, products or devices that contain a series of steps or units do not need to be limited to those explicitly listed steps or units, but may include other steps or units not explicitly listed or inherent to these processes, methods, products or devices.

The embodiment of the disclosure may be applied to electronic devices having a plurality of photographing units, and the electronic devices may include: smart phones, tablet computers, e-readers, desktop computers, workstations, servers, Personal Digital Assistants (PDAs). Portable Multimedia Players (PMP), medical devices, cameras or wearable devices (such as watches, bracelets, glasses, head-mounted apparatuses and other accessory-type devices), electronic clothing, body-implantable skin chips, in-vehicle electronics, etc.

Flow diagrams of an optional disclosure of the embodiment of the disclosure are described below. It should be noted that steps shown in the flow diagrams of the accompanying drawings may be implemented in a computer system such as a set of computer-executable instructions, and although a logical order is shown in the flow diagrams, under some conditions, the steps shown or described may be implemented in an order different from that herein.

Figure 1:
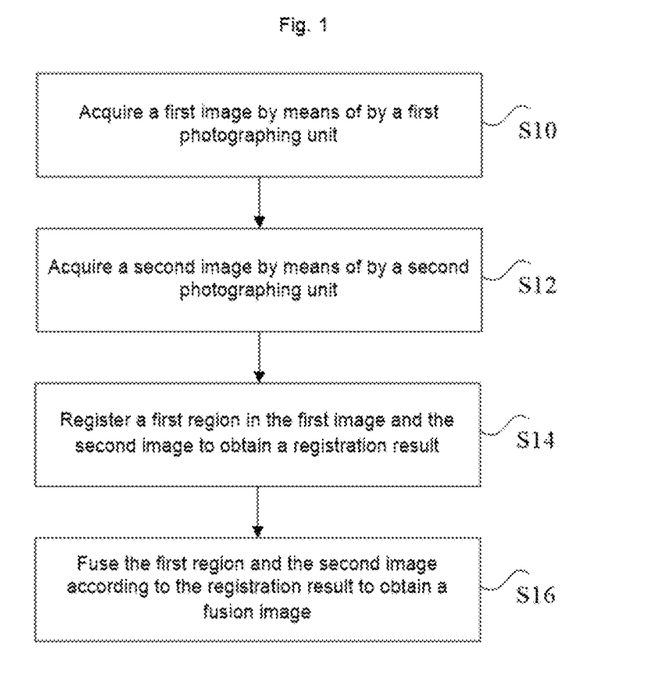
FIG. 1 is a flow diagram of an optional image processing method according to an embodiment of the disclosure.

FIG. 1 is a flow diagram of an optional image processing method according to an embodiment of the disclosure. As shown in FIG. 1, the image processing method includes:

S10, acquire a first image by a first photographing unit;

S12, acquire a second image by a second photographing unit;

S14: register a first region in the first image and the second image to obtain a registration result, where the first region and the second image correspond to the same field of view; and S16: fuse the first region and the second image according to the registration result to obtain a fusion image.

Optionally, in the embodiment of the disclosure, the image processing method may be used for processing images acquired by an electronic device with a plurality of photographing units, where the plurality of photographing units may have different fields of view totally or partially, and may be mounted at different positions of the electronic device respectively and independently, or integrated into one or more photographing modules totally or partially and then mounted on the electronic device in an embedded or external mode. The first photographing unit in step S10 may be a lens or a camera on the electronic device, and the second photographing unit in step S12 may be another lens or another camera on the electronic device. The first photographing unit and the second photographing unit may be mounted independently or integrated into one photographing module. The first photographing unit and the second photographing unit have different fields of view, and specifically, the first photographing unit has a field of view greater than that of the second photographing unit. For example, the first photographing unit may be a wide-angle camera, and the second photographing unit may be a telephoto camera. For another example, the first photographing unit may be an ultra-wide-angle camera, the second photographing unit may be a wide-angle camera, etc.

In the embodiment of the disclosure, through the above steps, images acquired by photographing units with at least two different fields of view may be fused, so as to optimize image quality and display higher-definition images. When an electronic device includes photographing units with a plurality of different fields of view, such as an ultra-wide-angle camera, a wide-angle camera and a telephoto camera, or an ultra-wide-angle camera, a wide-angle camera, a telephoto camera and an ultra-telephoto camera, when a user takes a picture, the photographing units may be selected and utilized reasonably, and an image with the best definition may be intelligently synthesized.

In another embodiment of the disclosure, the image processing method may further include: S18: process a second region in the first image by using image quality improvement technique, where the second region is a region except the first region in the first image. Optionally, the image quality improvement technique includes a deep learning technique based on a single frame or multiple frames, and the technical effects of improving resolution, removing blurs, removing noise, etc. may be realized.

In another embodiment of the disclosure, the image processing method may further include S13, that is, process the first image and the second image after the first image or the second image is acquired, which includes: Adjust automatic Exposure (AE) information, Automatic White Balance (AWB) information, Automatic Focus (AF) information, etc. of the first image or the second image to rectify a color, brightness, etc. of the first image or the second image.

Figure 2:
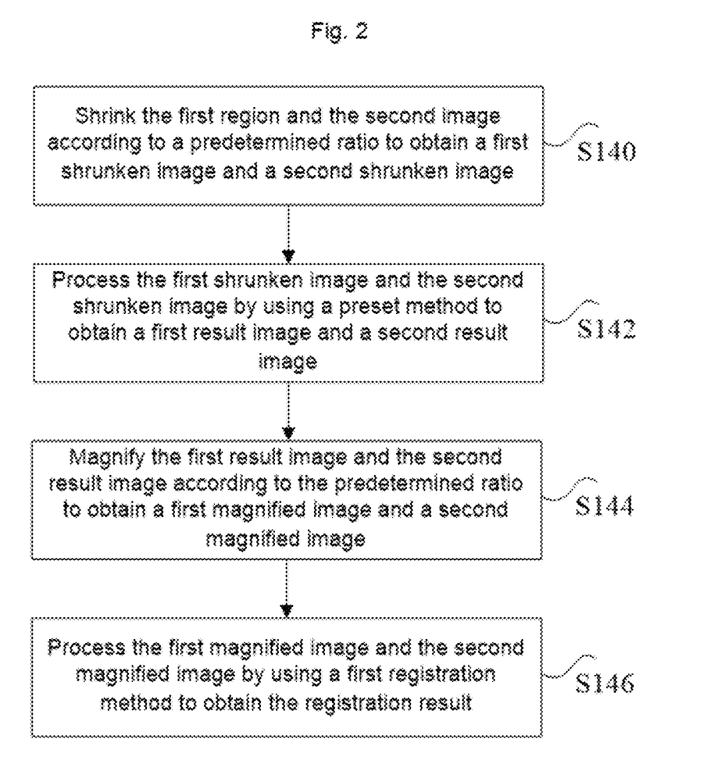
FIG. 2 is a flow diagram of an optional image registration method according to an embodiment of the disclosure.

S14 is described in detail below. FIG. 2 is a flow diagram of an optional image registration method according to an embodiment of the disclosure.

In the embodiment of the disclosure, S14, that is, the step of registering a first region in the first image and the second image to obtain a registration result may include:

S140: shrink the first region and the second image according to a predetermined ratio to obtain a first shrunken image and a second shrunken image;

S142: process the first shrunken image and the second shrunken image by using a preset method to obtain a first result image and a second result image;

S144: magnify the first result image and the second result image according to the predetermined ratio to obtain a first magnified image and a second magnified image; and S146: process the first magnified image and the second magnified image by using a first registration method to obtain the registration result.

Optionally, in one embodiment of the disclosure, the predetermined ratio is mainly customized according to performance requirements, e.g., 2 times, 3 times, etc. By shrinking the first region and the second image according to the predetermined ratio, processing time of a whole algorithm may be optimized, and execution performance of the algorithm may be accelerated.

Optionally, in one embodiment of the disclosure, the preset method is a Dense Inverse Search (DIS) optical flow method, which mainly includes: block matching, sparse optical flow densification and variational optimization and combines both a sparse optical flow method and a dense optical flow method.

Optionally, in another embodiment of the disclosure, the step of processing the first shrunken image and the second shrunken image by using a preset method to obtain a first result image and a second result image includes: perform a first process on the first shrunken image and the second shrunken image to obtain a first processing result, wherein the first process comprises epipolar line rectification and matching computation; and perform a second process on the first processing result to obtain the first result image and the second result image. The epipolar line rectification is used for rectifying corresponding pixel points between the first shrunken image and the second shrunken image to the same horizontal line, and an image pair subjected to the epipolar line rectification only has parallax in a horizontal direction, but has no parallax in a vertical direction (or only has parallax in a vertical direction, but has no parallax in a horizontal direction). Therefore, the matching computation may be reduced from two dimensions to one dimension, thereby improving a matching speed and accuracy. The matching computation may be used for computing an offset quantity of corresponding pixel points in the image pair subjected to the epipolar line rectification, and corresponding pixel points of the first shrunken image or the second shrunken image are adjusted according to the offset quantity, thereby matching the image pair.

Since the image pair subjected to the epipolar line rectification is geometrically deformed with respect to the first shrunken image and the second shrunken image, it is necessary to process the first processing result for the second time in order to obtain a parallax image corresponding to the first shrunken image and the second shrunken image. In one embodiment of the disclosure, the step of processing the first processing result for the second time to obtain the first result image and the second result image includes: process the first processing result by using epipolar fine rectification inverse transformation and a second registration method to obtain the first result image and the second result image. The epipolar line rectification inverse transformation and the second registration method may be carried out sequentially. For example, in one embodiment, the first processing result is processed first by using epipolar line rectification inverse transformation to obtain a second processing result; and then the second processing result is processed by using the second registration method to obtain the first result image and the second result image. For another example, in another embodiment, the first processing result is processed first by using the second registration method to obtain a third processing result; and then the third processing result is processed by using the epipolar fine rectification inverse transformation to obtain the first result image and the second result image. Therefore, geometric shapes of the first result image and the second result image processed by the epipolar line rectification inverse transformation and the second registration method are consistent with those of the first shrunken image and the second shrunken image, and corresponding pixel points have the same homogeneous coordinates.

Optionally, in the embodiment of the disclosure, the first registration method or the second registration method may include at least one of the following: a dense optical flow computation method, a semi-dense optical flow computation method, a local registration method and a global registration method.

Through the above steps, the first region in the first image and the second image, which correspond to the same field of view, may be registered to obtain the registration result.

Figure 3:
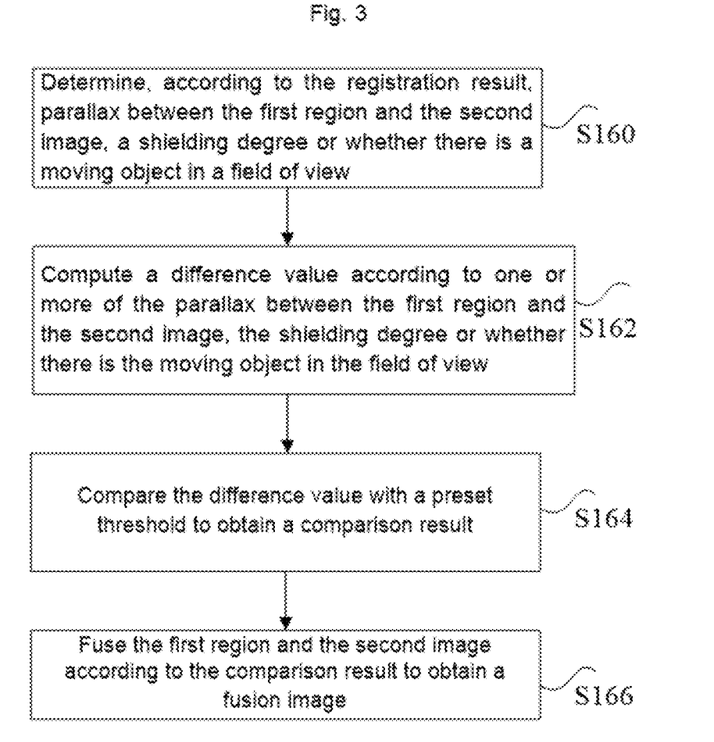
FIG. 3 is a flow diagram of an optional image fusing method according to an embodiment of the disclosure.

The following describes step S16 in detail. FIG. 3 is a flow diagram of an optional image fusing method according to an embodiment of the disclosure.

In the embodiment of the disclosure, S16, the step of fusing the first region and the second image according to the registration result includes:

S160: determine, according to the registration result, parallax between the first region and the second image, a shielding degree or whether there is a moving object in a field of view;

S162: compute a difference value according to one or more of the parallax between the first region and the second image, the shielding degree or whether there is the moving object in the field of view;

S164: compare the difference value with a preset threshold to obtain a comparison result; and S166: fuse the first region and the second image according to the comparison result to obtain a fusion image.

Optionally, in the embodiment of the disclosure, when the difference value is greater than or equal to the preset threshold, the comparison result indicates that the parallax between the first region and the second image is relatively great, the shielding degree is relatively great or there is a moving object in the field of view, and corresponding pixel points of the first region and the second image are not to be fused. When the difference value is smaller than the preset threshold, the comparison result indicates that the parallax between the first region and the second image is relatively small, the shielding degree is relatively small, or there is no a moving object in the field of view, and corresponding pixel points of the first region and the second image are to be fused. In one embodiment of the disclosure, the preset threshold may be determined according to a desired fusion effect, and the greater the preset threshold is, the looser a fusion requirement is, and the more the fused pixel points in the first region and the second image are. The smaller the preset threshold is, the stricter the fusion requirement is, and the less the fused pixel points, in the first region and the second image are.

Optionally, in the embodiment of the disclosure, the parallax and the shielding degree are indicated by errors obtained by carrying out epipolar line rectification and matching computation on the first shrunken image and the second shrunken image. Whether there is a moving object in a field of view is indicated by errors of corresponding pixel points of the first magnified image and the second magnified image.

Figure 4A:
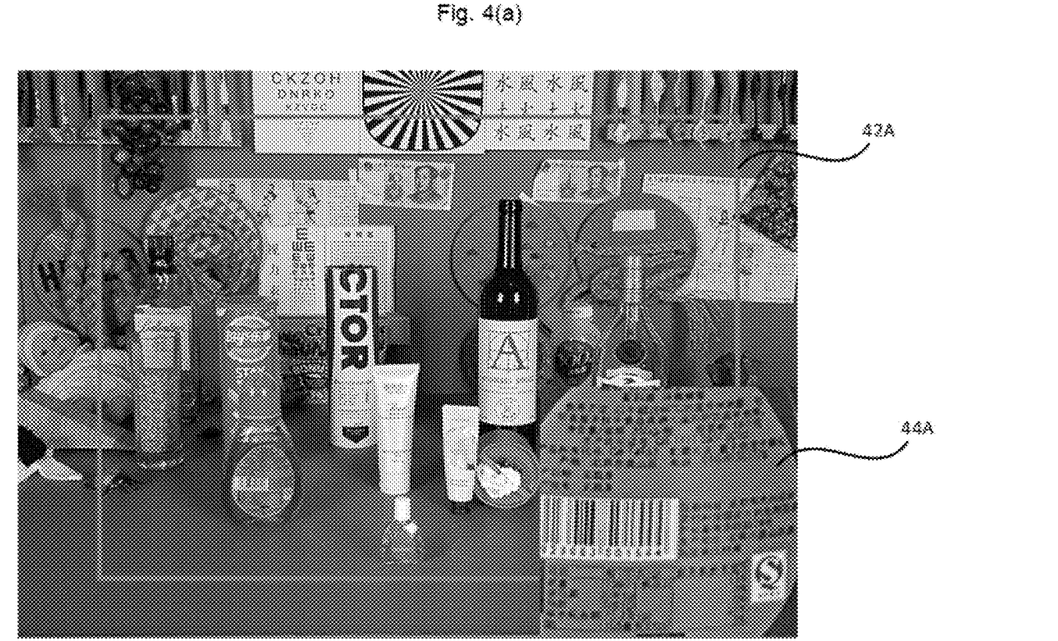
FIGS. 4(a)-4(c) show a test effect using the image processing method disclosed in an embodiment of the disclosure.
Figure 4B:
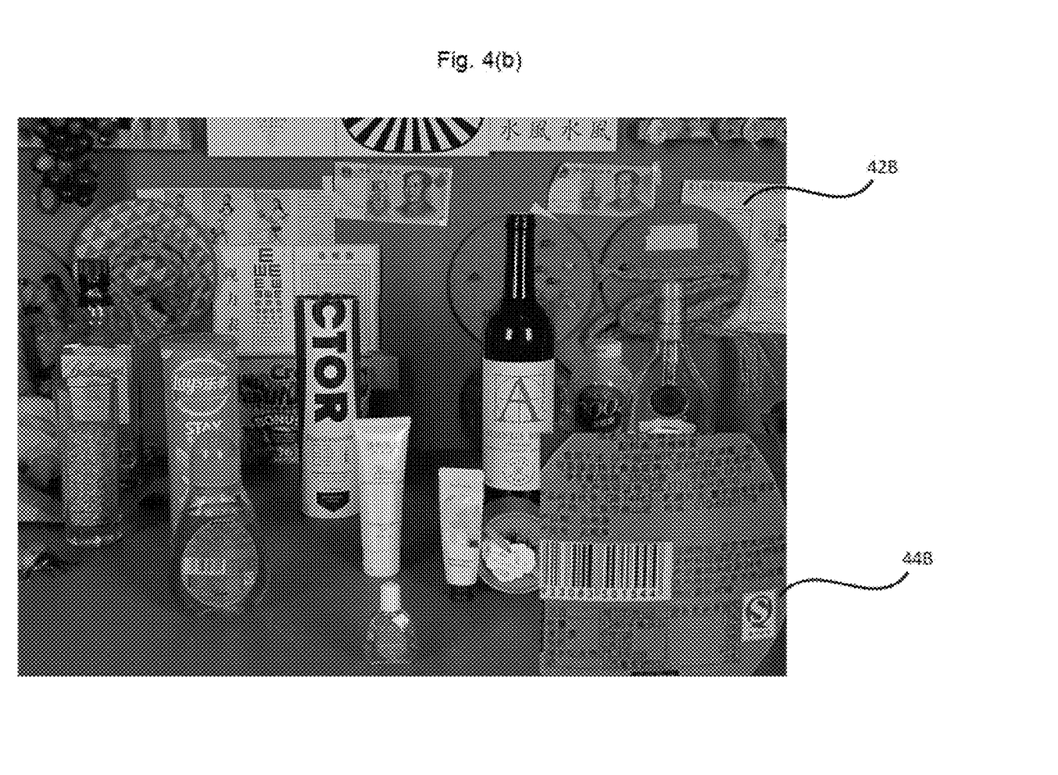
Figure 4C:
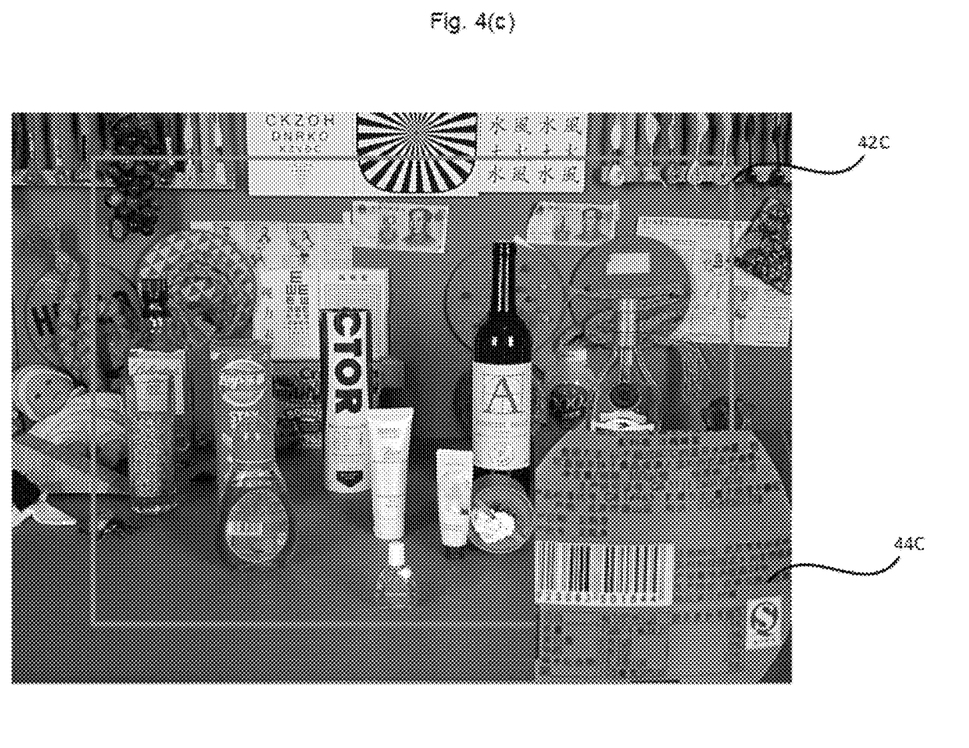

FIGS. 4(a)-4(c) show a test effect using the image processing method disclosed in an embodiment of the disclosure. FIG. 4(a) shows the first image acquired by the first photographing unit. In FIG. 4(a), a region in a box is the first region 42A in the first image. When a target object is relatively small, such as a label of a bee jar, the first photographing unit may not focus the target object accurately, resulting in a blurred images. As shown in the label enlarged view 44A shown in the lower right corner of FIG. 4(a), characters on the label is extremely blurred and is not easy to recognize. FIG. 4(b) shows the second image acquired by the second photographing unit. The second image 42B corresponds to the first region 42A in the first image. When the target object is relatively small, such as the label of the bee jar, the second photographing unit may focus the target object accurately to obtain a clear image. As shown in the label enlarged view 448 shown in the lower right corner of FIG. 4(b), characters on the label is clearly visible. FIG. 4(c) shows the fusion image obtained by using the image processing method disclosed in the embodiment of the disclosure. Under the condition that an angle of view of an obtained image is unchanged, that is, the fusion image 4(e) has the same angle of view as that the first image 4(a), a fusion region 42C is obtained by fusing the first region of the first image and the second image. As shown in the label enlarged view 44C shown in the lower right corner of FOG. 4(c), characters on the label is still clearly visible after fusion.

Figure 5:
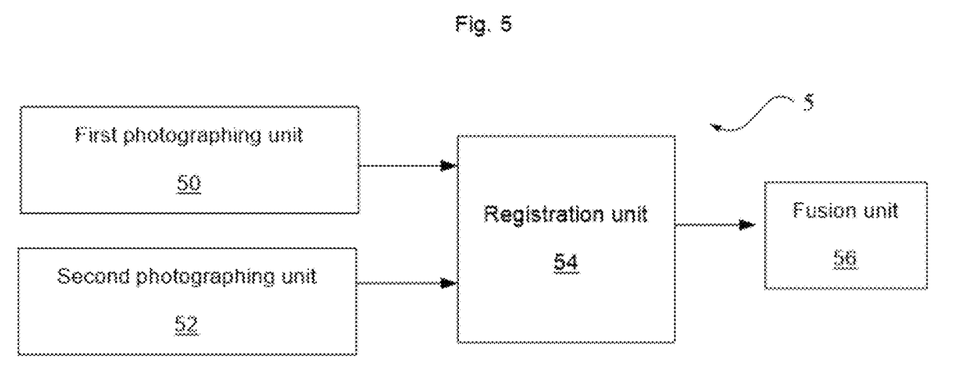
FIG. 5 is a structure block diagram of an optional image processing apparatus according to an embodiment of the disclosure.

FIG. 5 is a structure block diagram of an optional image processing apparatus according to an embodiment of the disclosure. As shown in FIG. 5, the image processing apparatus 5 includes:

a first photographing unit 50 configured to acquire a first image;

a second photographing unit 52 configured to acquire a second image;

a registration unit 54 configured to register a first region in the first image and the second image to obtain a registration result, where the first region and the second image correspond to the same field of view; and a fusion unit 56 configured to fuse the first region and the second image according to the registration result to obtain a fusion image.

Optionally, in the embodiment of the disclosure, the image processing apparatus may further include an image quality improvement unit configured to process a second region in the first image by using image quality improvement technique, where the second region is a region except the first region in the first image. Optionally, the image quality improvement technique includes a deep learning technique based on a single frame or multiple frames, and the technical effects of improving resolution, removing blurs, removing noise, etc. may be realized.

In another embodiment of the disclosure, the image processing apparatus may further include a rectification unit configured to process the first image and the second image after the first image or the second image is acquired, which includes: Adjust automatic Exposure (AE) information, Automatic White Balance (AWB) information, Automatic Focus (AF) information, etc. of the first image or the second image to rectify a color, brightness, etc. of the first image or the second image.

Optionally, in the embodiment of the disclosure, the registration unit 54 may include:

a shrinking unit 540 configured to shrink the first region and the second image according to a predetermined ratio to obtain a first shrunken image and a second shrunken image;

a first processing unit 542 configured to process the first shrunken image and the second shrunken image by using a preset method to obtain a first result image and a second result image a magnification unit 544 configured to magnify the first result image and the second result image according to the predetermined ratio to obtain a first magnified image and a second magnified image; and a first registration sub-unit 546 configured to process the first magnified image and the second magnified image by using a first registration method to obtain the registration result.

Optionally, in one embodiment of the disclosure, the predetermined ratio is mainly customized according to performance requirements, e.g., 2 times, 3 times, etc. By shrinking the first region and the second image according to the predetermined ratio, processing time of a whole algorithm may be optimized, and execution performance of the algorithm may be accelerated.

Optionally, in one embodiment of the disclosure, the preset method is a Dense Inverse Search (DIS) optical flow method, which mainly includes: block matching, sparse optical flow densification and variational optimization and combines both a sparse optical flow method and a dense optical flow method.

Optionally, in another embodiment of the disclosure, the step of processing the first shrunken image and the second shrunken image by using a preset method to obtain a first result image and a second result image includes: perform a first process on the first shrunken image and the second shrunken image to obtain a first processing result, wherein the first process comprises epipolar line rectification and matching computation; and perform a second process on the first processing result to obtain the first result image and the second result image. The epipolar line rectification is used for rectifying corresponding pixel points between the first shrunken image and the second shrunken image to the same horizontal line, and an image pair subjected to the epipolar line rectification only has parallax in a horizontal direction, but has no parallax in a vertical direction (or only has parallax in a vertical direction, but has no parallax in a horizontal direction). Therefore, the matching computation may be reduced from two dimensions to one dimension, thereby improving a matching speed and accuracy. The matching computation may be used for computing an offset quantity of corresponding pixel points in the image pair subjected to the epipolar line rectification, and corresponding pixel points of the first shrunken image or the second shrunken image are adjusted according to the offset quantity, thereby matching the image pair.

Since the image pair subjected to the epipolar line rectification is geometrically deformed with respect to the first shrunken image and the second shrunken image, it is necessary to process the first processing result for the second time in order to obtain a parallax image corresponding to the first shrunken image and the second shrunken image. In one embodiment of the disclosure, the step of processing the first processing result for the second time to obtain the first result image and the second result image includes: process the first processing result by using epipolar line rectification inverse transformation and a second registration method to obtain the first result image and the second result image. The epipolar line rectification inverse transformation and the second registration method may be carried out sequentially. For example, in one embodiment, the first processing result is processed first by using epipolar line rectification inverse transformation to obtain a second processing result; and then the second processing result is processed by using the second registration method to obtain the first result image and the second result image. For another example, in another embodiment, the first processing result is processed first by using the second registration method to obtain a third processing result; and then the third processing result is processed by using the epipolar line rectification inverse transformation to obtain the first result image and the second result image. Therefore, geometric shapes of the first result image and the second result image processed by the epipolar line rectification inverse transformation and the second registration method are consistent with those of the first shrunken image and the second shrunken image, and corresponding pixel points have the same homogeneous coordinates.

Optionally, in the embodiment of the disclosure, the first registration method or the second registration method may include at least one of the following: a dense optical flow computation method. a semi-dense optical flow computation method, a local registration method and a global registration method.

Through the above steps, the first region in the first image and the second image, which correspond to the same field of view, may be registered to obtain the registration result.

Optionally, in the embodiment of the disclosure, the fusion unit 56 may include:

a determination unit 560 configured to determine, according to the registration result, parallax between the first region and the second image, a shielding degree or whether there is a moving object in a field of view;

a computation unit 562 configured to compute a difference value according to one or more of the parallax between the first region and the second image, the shielding degree or whether there is the moving object in the field of view;

a comparison unit 564 configured to compare the difference value with a preset threshold to obtain a comparison result and a fusion sub-unit 566 configured to fuse the first region and the second image according to the comparison result to obtain the fusion image.

Optionally, in the embodiment of the disclosure, when the difference value is greater than or equal to the preset threshold, the comparison result indicates that the parallax between the first region and the second image is relatively great, the shielding degree is relatively great or there is a moving object in the field of view, and corresponding pixel points of the first region and the second image are not to be fused. When the difference value is smaller than the preset threshold, the comparison result indicates that the parallax between the first region and the second image is relatively small, the shielding degree is relatively small, or there is no a moving object in the field of view, and corresponding pixel points of the first region and the second image are to be fused. In one embodiment of the disclosure, the preset threshold may be determined according to a desired fusion effect, and the greater the preset threshold is, the looser a fusion requirement is, and the more the fused pixel points in the first region and the second image are. The smaller the preset threshold is, the stricter the fusion requirement is, and the less the fused pixel points in the first region and the second image are.

Optionally, in the embodiment of the disclosure, the parallax and the shielding degree are indicated by errors obtained by carrying out epipolar line rectification and matching computation on the first shrunken image and the second shrunken image. Whether there is a moving object in a field of view is indicated b errors of corresponding pixel points of the first magnified image and the second magnified image.

Figure 6A:
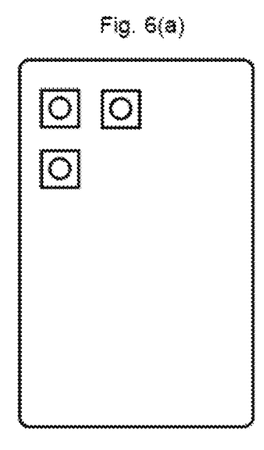
FIGS. 6(a)-6(c) show an electronic device having different camera positions according to an embodiment of the disclosure separately.
Figure 6B:
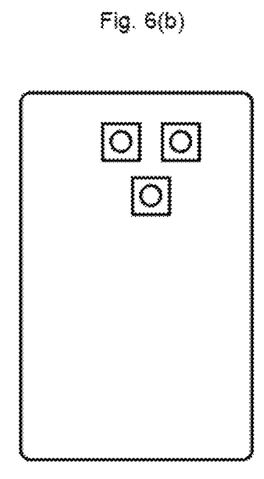
Figure 6C:
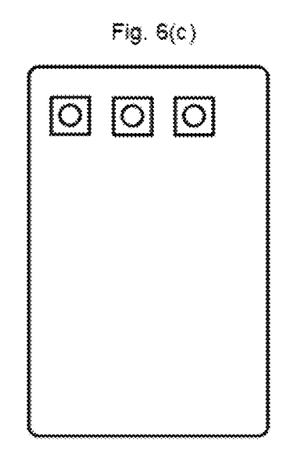

The embodiment of the disclosure may be applied to electronic devices having a plurality of photographing units. FIGS. 6(*a*)-6(*c*) show the electronic device having different camera positions according to an embodiment of the disclosure respectively. It can be seen that a plurality of photographing units may be mounted at different positions of the electronic device respectively and independently. The plurality of photographing units include at least two photographing units having different fields of view.

Of course, FIGS. 6(*a*)-6(*c*) are merely examples of an electronic device having three photographing units. Those skilled in the art may know that the number and positions of the plurality of photographing units in the electronic device may be adjusted according to requirements, and are not limited to the examples given in FIGS. 6(*a*)-6(*c*). For example, three or above photographing units may be provided, may have different fields of view partially or totally, and may be mounted at different positions of the electronic device respectively and independently, or integrated into one or more photographing modules totally or partially and then mounted on the electronic device in an embedded or external mode.

Another aspect of the embodiment of the disclosure further provides an electronic device. The electronic device includes: a processor, and a memory configured to store an executable instruction of the processor, where the processor is configured to execute the executable instruction to implement any one of the above image processing methods.

Another aspect of the embodiment of the disclosure further provides a storage medium including a stored program, where when the program is run, a device where the storage medium is positioned is controlled to implement any one of the above image processing methods.

The serial numbers of the above-mentioned embodiments of the disclosure are for description only and do not indicate the advantages and disadvantages of the embodiments.

In the above embodiments of the disclosure, description for each of the embodiments has its own emphasis, and the part which is not described in detail in a certain embodiment may refer to relevant description in other embodiments.

In several embodiments provided in the disclosure, it should be understood that the disclosed technique may be implemented in other ways. The apparatus embodiments described above are merely illustrative, for example, a division of the units may be a division of logical functions, and in practice there may be additional ways of division, for example, a plurality of units or assemblies may be combined or integrated into another system, or some features may be ignored or not executed. As another point, shown or discussed coupling or direct coupling or communication connection between each other may be an indirect coupling or communication connection by some interface, unit or module, and may be in an electrical or other form.

The units illustrated as separate components may be physically or not physically separated, and the components shown as units may be physical units or not physical units, that is, may be located in one place, or may also be distributed over a plurality of units. Part or all of the units may be selected according to actual needs to achieve the objective of the solution of the embodiment.

In addition, all functional units in each of the embodiments of the disclosure may be integrated into one processing unit, or may be independently and physically present, or two or more units may be integrated into one unit. The above-mentioned integrated unit may be implemented in the form of hardware or a software functional unit.

The integrated unit may be stored in a computer readable storage medium if implemented in the form of a software functional unit and sold or used as an independent product. On the basis of the understanding, the technical solution of the disclosure may be embodied in the form of a software product in essence or a part contributing to the prior art or all or part of the technical solution, and the computer software product is stored in a storage medium and includes several instructions for making a computer device (which may be a personal computer, a server or a network device, etc.) implement all or part of the steps of the methods described in the various embodiments of the disclosure. The foregoing storage medium includes: a universal serial bus (USB) flash disk, a read-only-memory (ROM), a random access memory (RAM), a mobile hard disk, a magnetic disk, an optical disk and other media capable of storing program codes.

What is described above is merely the preferred implementation of the disclosure, it should be pointed out that those of ordinary skill in the art may also make several improvements and modifications without departing from the principle of the disclosure, and these improvements and modifications should also fall within the scope of protection of the disclosure.

What is claimed is:

1. An image processing method, applied in an electronic device having at least two photographing units, comprising:

acquiring a first image by a first photographing unit;
acquiring a second image by a second photographing unit;
registering a first region in the first image and the second image to obtain a registration result, wherein the first region and the second image correspond to the same field of view; and
fusing the first region and the second image according to the registration result to obtain a fusion image;
wherein the at least two photographing units are either lens or camera;
wherein registering the first region in the first image and the second image to obtain the registration result comprises:
shrinking the first region and the second image according to a predetermined ratio to obtain a first shrunken image and a second shrunken image;
processing the first shrunken image and the second shrunken image by using a preset method to obtain a first result image and a second result image;
magnifying the first result image and the second result image according to the predetermined ratio to obtain a first magnified image and a second magnified image; and
processing the first magnified image and the second magnified image by using a first registration method to obtain the registration result.

2. The image processing method according to claim 1, further comprising:
processing a second region in the first image by using image quality improvement technique, wherein the second region is a region except the first region in the first image.

3. The image processing method according to claim 2, wherein the image quality improvement technique comprises deep learning technique based on a single frame or multiple frames.

4. The image processing method according to claim 1, wherein the first photographing unit and the second photographing unit have different fields of view.

5. The image processing method according to claim 1, wherein the preset method is a Dense Inverse Search (DIS) optical flow method.

6. The image processing method according to claim 1, wherein processing the first shrunken image and the second shrunken image by using the preset method to obtain the first result image and the second result image comprises:
performing a first process on the first shrunken image and the second shrunken image to obtain a first processing result, wherein the first process comprises epipolar line rectification and matching computation; and
performing a second process on the first processing result to obtain the first result image and the second result image.

7. The image processing method according to claim 6, wherein performing the second process on the first processing result to obtain the first result image and the second result image comprises:
processing the first processing result by using epipolar line rectification inverse transformation and a second registration method to obtain the first result image and the second result image.

8. The image processing method according to claim 7, wherein processing the first processing result by using epipolar line rectification inverse transformation and the second registration method to obtain the first result image and the second result image comprises:
processing the first processing result by using the epipolar line rectification inverse transformation to obtain a second processing result; and
processing the second processing result by using the second registration method to obtain the first result image and the second result image.

9. The image processing method according to claim 7, wherein processing the first processing result by using epipolar line rectification inverse transformation and the second registration method to obtain the first result image and the second result image comprises:
processing the first processing result by using the second registration method to obtain a third processing result; and
processing the third processing result by using the epipolar line rectification inverse transformation to obtain the first result image and the second result image.

10. The image processing method according to claim 1, wherein the first registration method comprises at least one of the following: a dense optical flow computation method, a semi-dense optical flow computation method, a local registration method and a global registration method.

11. The image processing method according to claim 1, wherein fusing the first region and the second image according to the registration result to obtain the fusion image comprises:
determining according to the registration result, parallax between the first region and the second image, a shielding degree or whether there is a moving object in a field of view;
computing a difference value according to one or more of the parallax between the first region and the second image, the shielding degree or whether there is the moving object in the field of view;
comparing the difference value with a preset threshold to obtain a comparison result; and
fusing the first region and the second image according to the comparison result to obtain the fusion image.

12. The image processing method according to claim 11, the fusing the first region and the second image according to the comparison result to obtain the fusion image comprises:
wherein when the difference value is greater than or equal to the preset threshold, the comparison result indicates that the parallax between the first region and the second image is relatively great, the shielding degree is relatively great or there is a moving object in the field of view, and corresponding pixel points of the first region and the second image are not to be fused; and when the difference value is smaller than the preset threshold, the comparison result indicates that the parallax between the first region and the second image is relatively small, the shielding degree is relatively small, or there is no moving object in the field of view, and corresponding pixel points of the first region and the second image are to be fused.

13. A non-transitory storage medium, comprising a stored program, wherein when the program is run, a device where the storage medium is positioned is controlled to implement the image processing method of claim 1.

14. An electronic device, comprising:
a processor, and
a memory configured to store an executable instruction of the processor, wherein the processor is configured to execute the executable instruction to implement the image processing method of claim 1.

* * * * *